(No Model.) 2 Sheets—Sheet 1.

P. CONNOLLY.
PLUMBER'S TRAP.

No. 277,888. Patented May 22, 1883.

Attest:
Geo. H. Graham
A. N. Jasbera

Inventor,
Patrick Connolly,
by Munden & Philipp
Attys.

(No Model.) 2 Sheets—Sheet 2.

P. CONNOLLY.
PLUMBER'S TRAP.

No. 277,888. Patented May 22, 1883.

Attest:
Geo. M. Graham
A. N. Jasbera

Inventor,
Patrick Connolly,
by Munson & Philipp
Attys.

N. PETERS, Photo-Lithographer, Washington, D. C.

UNITED STATES PATENT OFFICE.

PATRICK CONNOLLY, OF BROOKLYN, NEW YORK, ASSIGNOR, BY MESNE ASSIGNMENTS, TO JULIA CONNOLLY, OF SAME PLACE.

PLUMBER'S TRAP.

SPECIFICATION forming part of Letters Patent No. 277,888, dated May 22, 1883.

Application filed October 30, 1882. (No model.)

*To all whom it may concern:*

Be it known that I, PATRICK CONNOLLY, a citizen of the United States, residing in the city of Brooklyn, county of Kings, and State of New York, have invented certain new and useful Improvements in Plumbers' Traps, fully described and represented in the following specification and the accompanying drawings, forming a part of the same.

It is the object of the present invention to produce a trap which will not be liable to become clogged or obstructed by the accumulation therein of the refuse matter passing through the waste-water pipes, which can be readily removed from and replaced in position without disturbing the main pipes with which it is connected, or breaking permanent joints, and which, without being unduly heavy, shall have a holding capacity sufficient to prevent siphoning. The first of these objects is attained by making the body or casing of the trap of spherical or spheroidal form, its internal wall being left entirely unobstructed, and so introducing the water that it will be caused to sweep over all parts of the interior of the body or casing, and thereby prevent any matter from adhering thereto. The second object is attained by forming the body or casing of the trap of some comparatively light and thin sheet metal, preferably copper, so that said casing may be made of sufficient size to hold a large quantity of water, and yet contain so little metal as not to be objectionable by reason of its weight. The third object is attained by providing the trap and the main inlet and outlet pipes with suitable screw-couplings, which can readily be loosened or tightened for the removal or insertion of the trap without disturbing the main pipes, all of which will be hereinafter fully explained and particularly pointed out.

Figure 1:
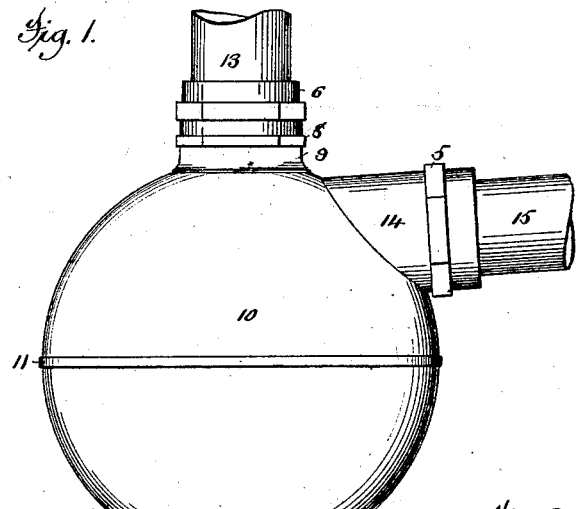
Figure 2:
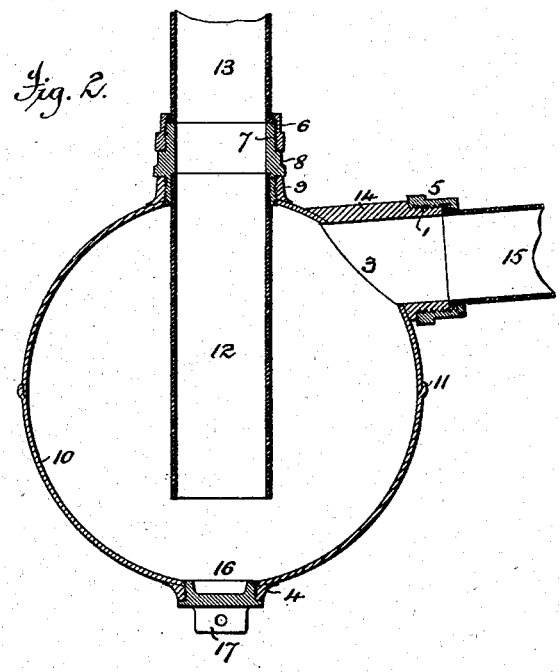

In the accompanying drawings, Figure 1 is an elevation of a trap embodying the invention. Fig. 2 is a central vertical section of the same; and Figs. 3, 4, 5, and 6 are diagrammatic views, illustrating modifications to be hereinafter explained.

Referring particularly to Figs. 1 and 2, it will be seen that the body of the trap consists of a spherical casing, 10, which may be composed of any suitable light and strong metal, but is preferably of copper. This casing, for the sake of economy in construction, is preferably formed by spinning, but it may be cast or struck up by dies. For the same reason it is also preferably made in two parts, as shown in the drawings, said parts being permanently united to each other by brazing, or by solder, as indicated at 11. The casing thus constructed is provided upon its upper side with an inlet-opening, around which is secured a short extension or re-enforce, 9, said re-enforce being screw-threaded preferably upon the interior, so as to receive the threaded portion of an enlargement or re-enforce, 8, upon the inlet-pipe 12. The outer end of the re-enforce 8 is also provided with a threaded portion, 7, adapted to receive the threads of a coupling, 6, by means of which the trap is detachably connected with the main inlet-pipe 13, it being of course understood that the joints between the pipes 12 and 13, and between the pipe 12 and re-enforce 9, are made perfectly tight by any approved form of packing, or by ground joints. The inlet-pipe 12 extends downward, as shown, to a point near the bottom of the casing 10, so that the water flowing into the trap will be delivered at or near its bottom.

When the trap is to be used in some situations the outlet-pipe may enter the trap at a point near its bottom, and extend upward, so as to receive the water at a point near the top of the trap, as shown in my former Letters Patent, No. 260,666. In many situations, however, such construction will be inconvenient, and therefore, in the present case, I provide the trap with an outlet-opening, 3, at a point near its top. The edge of this opening is surrounded by a short projection or re-enforce, 14, provided with a screw-threaded portion, 1, upon its outer end, so as to receive the threads of a coupling, 5, by which the trap will be connected with the main outlet-pipe 15, the joints thus formed being of course made water-tight by any approved form of packing, or otherwise.

When desired, the trap may also be provided at its bottom with a cleaning-hole, 16, which will be surrounded by a projection or re-enforce, 4, and closed by a screw-cap, 17.

In some instances it may be found desirable to make the casing 10 of glass or other transparent substance, as shown in my former Letters Patent, No. 253,845, as this material possesses certain advantages in allowing the inspection of the interior of the trap without removing it from its fixed position.

The traps of this general structure heretofore in use have had straight or substantially straight walls, or have been provided with a cross-partition connected to the body, so as to obstruct its interior wall and prevent the water from sweeping over all parts of the inside of the casing, from which it resulted that the inflowing water would simply rise in the trap to the level of the outlet and then flow out. It has been found, however, that in such constructions the refuse matter passing through the waste-water pipe, more or less of which floats upon the top of the water in the trap, will adhere to and gradually accumulate upon the top and sides of the trap and the sides of the inner pipe, until finally the flow of the water through the trap will become impeded or wholly stopped.

I have found that by making the casing of the trap spherical, and having its interior wall unobstructed, the inflowing water, instead of simply rising and falling in the trap, will be forced upward along the curved sides of the casing, so as to constantly sweep over and wash all parts of its interior, thereby preventing refuse matter from adhering to and accumulating upon the same. This feature I regard as of great importance, as by it the trap is made practically self scouring or cleaning.

By making the trap spherical in form and of a light thin material, as specified, I am enabled to secure a large holding capacity without making the trap unduly heavy. This holding capacity is of great importance, in that it effectually prevents what is known in the art as "siphoning"—that is to say, the withdrawal of the water from the trap and the consequent destruction of the seal by sudden pressure induced by the formation of a partial vacuum in the discharge-pipe, it being impossible in the structure shown to thus withdraw a sufficient amount of the water from the trap to bring its level below the end of the inlet-pipe 12.

By means of the couplings shown and described it will also be seen that should it be desired, for any reason, to remove the trap, it can readily be done without disturbing the main inlet and outlet pipes, or breaking any permanent connection.

Although it is preferable that the casing 10 should be spherical, yet it may be varied somewhat from such form without departing from my invention, it only being necessary that sufficient curvature be given to its walls to cause the inflowing water to sweep over and wash all parts of the interior.

Figure 3:
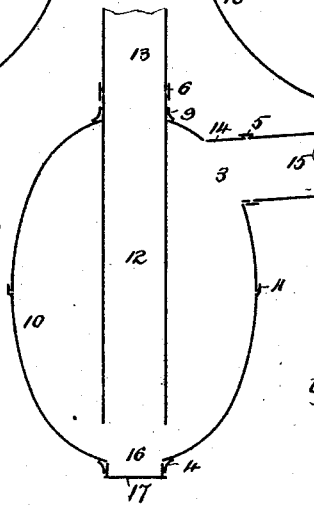

Fig. 3 illustrates a casing of spheroidal form, but still having sufficient curvature to be self scouring or cleaning.

Figure 4:
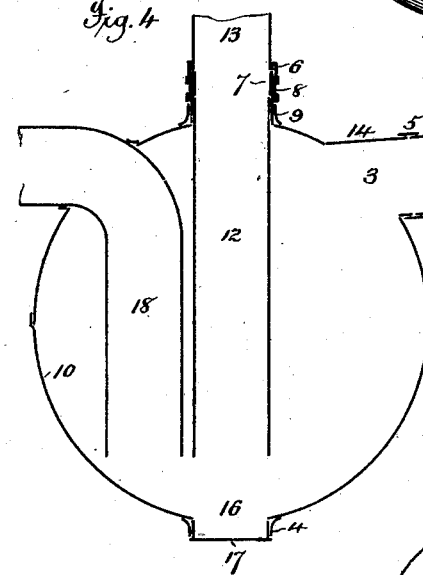

Fig. 4 illustrates how a single trap may be made to receive and discharge the water from two inlet-pipes. In this case the second inlet-pipe, 18, enters from the side of the casing and bends downward so as to discharge near the bottom. Of course more than two inlet-pipes may empty into a single casing, if desired.

Figure 5:
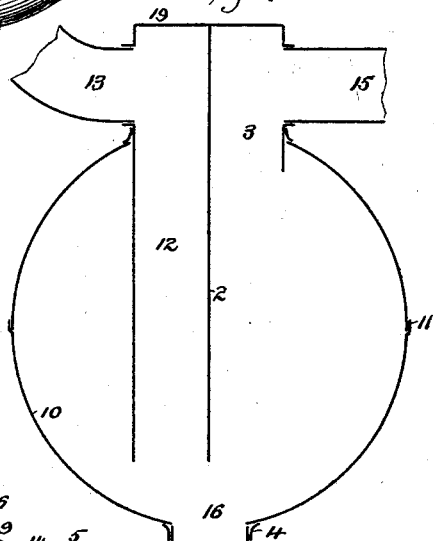

In Fig. 5 a construction is shown in which a single opening in the casing serves for both the inlet and outlet pipes. In this case the part 12 of the inlet-pipe is made of large size, and is provided with a partition, 2, and a cap, 19, for closing its end which projects outside the casing. One side of the pipe thus formed is cut away, so as to permit the water to enter the outlet-opening 3 at the top of the trap. When this construction is adopted the inlet and outlet pipes 13 15 will preferably be coupled to the sides of the projecting end of the pipe 12, as shown.

Figure 6:
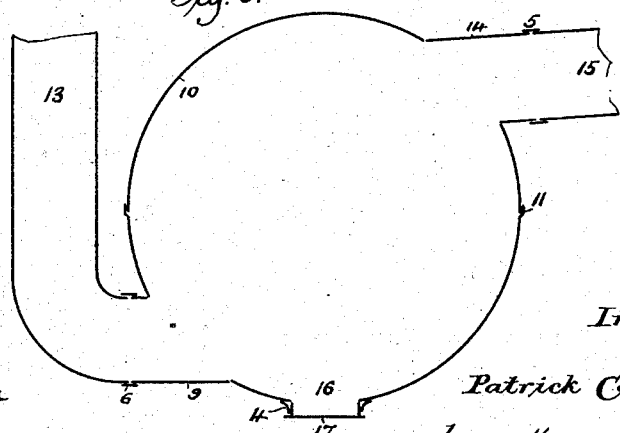

In Fig. 6 the inlet-pipe, instead of entering the top of the casing and extending downward, so as to discharge the water at the bottom, passes downward upon the outside of the casing and enters at a point near the bottom.

Although the couplings 8 9, 6 7, and 1 5 are of great utility in permitting the ready removal of the trap from its fixed position, and of the pipe 12 from the casing, yet it will readily be seen that they may be dispensed with and the parts made integral or permanently connected without destroying the function of the spherical or spheroidal casing. I therefore do not limit my invention by any specific form of connections.

What I claim is—

1. A plumber's trap consisting of a spheroidal casing having its internal wall unobstructed, and provided with an inlet-pipe which delivers the water at a point near the bottom of said casing, and a discharge-pipe which receives the water at a point near the top of said casing, substantially as described.

2. The combination, with the spheroidal casing 10, having its internal wall unobstructed, of the inlet-pipe 12, extending to a point near the bottom of said casing, and disconnected from the casing, except at its point of entrance, and the discharge-pipe 15, connected to said casing at a point near its top, substantially as described.

3. The combination, with the spheroidal casing 10, having its internal wall unobstructed, and provided with the cleaning-hole 16, of the inlet-pipe 12, extending to a point near the bottom of said casing, and disconnected from the casing, except at its point of entrance, and the discharge-pipe 15, connected to said casing at a point near its top, substantially as described.

4. The combination, with the casing 10, of the main inlet-pipe 13, removable inlet-pipe 12, terminating at a point near the bottom of said casing, main outlet-pipe 15, connected to said casing at a point near its top, and couplings 7 6 and 1 5, substantially as described.

5. The combination, with the spheroidal casing 10, having its internal wall unobstructed, of a plurality of inlet-pipes, as 12 18, arranged to deliver the water at a point near the bottom of said casing, said pipes being disconnected from said casing, except at their points of entrance, and an outlet-pipe, as 15, connected with said casing at a point near its top, substantially as described.

In testimony whereof I have hereunto set my hand in the presence of two subscribing witnesses.

PATRICK CONNOLLY.

Witnesses:
T. H. PALMER,
J. A. HOVEY.